Aug. 16, 1955  J. C. WILLIAMS  2,715,292
FISH HOOK GUARD DEVICE
Filed Nov. 25, 1952
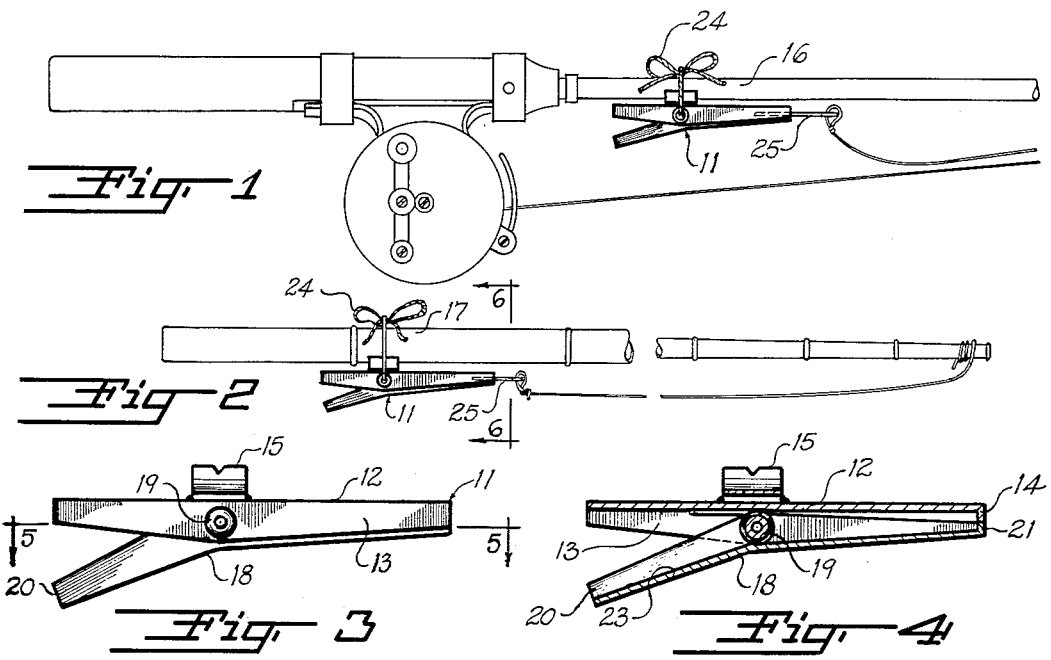
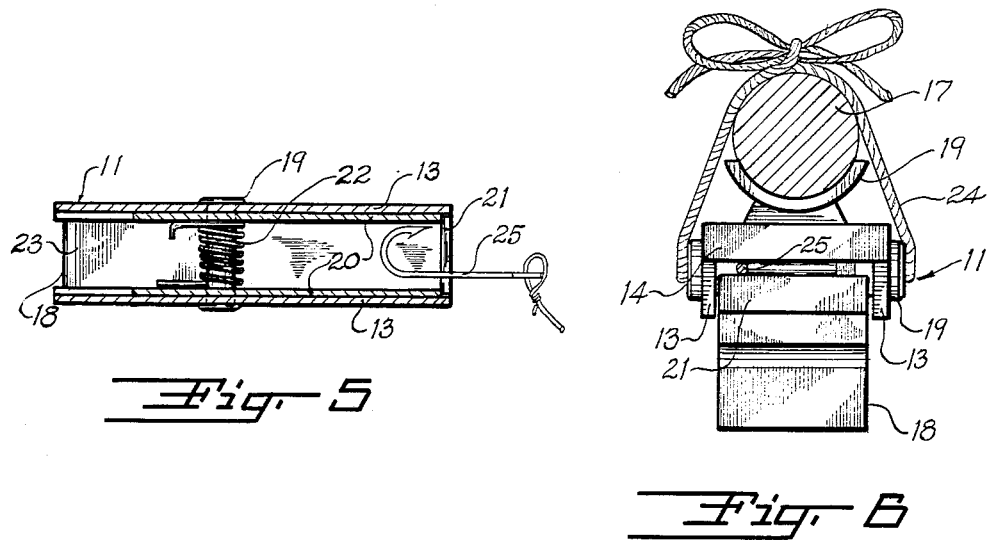
INVENTOR.
Jones C. Williams
BY
McMorrow, Berman + Davidson
ATTORNEYS United States Patent Office 2,715,292
Patented Aug. 16, 1955

2,715,292

FISH HOOK GUARD DEVICE

Jones C. Williams, Bossier City, La.

Application November 25, 1952, Serial No. 322,543

1 Claim. (Cl. 43—25.2)

This invention relates to fisherman's equipment, and more particularly to an improved guard device for retaining a fish hook attached to a fishing pole thereby to prevent the hook from catching on clothing or causing injury to the user of the fishing pole.

A main object of the invention is to provide a novel and improved fish hook guard device which is simple in construction, which is easy to install on a fishing pole, and which provides a means of retaining a fishing hook to thereby prevent injury to the user of the fishing pole or damage to the user's clothing from the hook.

Further objects and advantages of the invention will become apparent from the following description and claim, and from the accompanying drawings, wherein:

Figure 1 is a fragmentary side elevational view of a portion of a fishing pole provided with an improved fish hook guard device according to the present invention.

Figure 2 is a side elevational view similar to Figure 1, showing the guard device employed with a different type of fishing pole.

Figure 3 is an enlarged side elevational view of the fish hook guard device employed in Figures 1 and 2.

Figure 4 is a longitudinal vertical cross sectional view taken through the fish hook guard device of Figure 3.

Figure 5 is a horizontal cross sectional view taken through the hook guard device.

Figure 6 is an enlarged vertical transverse cross sectional view taken on the line 6—6 of Figure 2.

Referring to the drawings, the guard device is designated generally at 11 and comprises an elongated straight jaw member 12 of channel shape, and which is provided with the depending side flanges 13, 13. The jaw 12 is provided at one end thereof with the depending transverse flange 14, as shown in Figure 4. Rigidly secured to the top wall of the straight jaw member 12 is a concave socket element 15 which extends parallel to the jaw member 12 and which is adapted to receive the arcuately curved surface of a fishing pole, such as the fishing pole portion 16 in Figure 1 or the fishing pole portion 17 in Figure 2.

Designated at 18 is an angularly bent jaw member which is channel-shaped, and which is received rotatably between the intermediate portions of the side walls 13, 13 of the straight jaw member 12. Designated at 19 is a transversely extending hollow rivet which pivotally connects the angled jaw member 18 and the straight jaw member 12, the rivet 19 extending transversely through the side flanges 20, 20 of the angled jaw member 18 and the depending flanges 13, 13 of the straight jaw member 12, said rivet being located adjacent the bend in the angled jaw member 18, as shown in Figure 4. The end of the angled jaw member 18 is formed with the transverse upstanding wall element 21 which is engageable with the bottom edge of the transverse wall element 14 of the straight jaw member 12, as shown in Figure 4.

Designated at 22 is a coiled spring which surrounds the hollow member 19, one end of the coiled spring bearing against the under surface of the top wall of straight jaw member 12 and the other end of said coiled spring bearing against the opposite wall 23 of the angled jaw member 18, biasing the transverse wall element 21 of the angled jaw member into butting engagement with the transverse wall element 14 of the straight jaw member 12.

Designated at 24 is a string which extends through the hollow rivet 19 and which may be employed to tie the guard device to a fishing pole, as shown in Figures 1 and 2.

When thus secured to the pole, the jaw members 12 and 18 may be separated to receive a fishing hook 25, as shown in Figure 5, and upon release of the jaws, the hook will be securely clamped between the jaws, the barbed portion of the hook being housed in the channel-shaped forward portions of the jaw members 12 and 18, as shown in Figures 1, 2 and 5. Thus, the user of the fishing rod is protected against injury from the fishing hook or from damage to his clothing, and at the same time, whenever it is necessary to use the fishing rod, the hook may be readily removed by separating the forward portions of the jaw members 12 and 18. Therefore, the fishing pole may be conveniently carried without the necessity of removing the lines and hooks therefrom with complete safety from loose hooks. Therefore, the pole and line is immediately ready for fishing when the fishing location is reached. After fishing, the user may readily house the hook between the jaw members 12 and 18 in the manner above described.

The jaw members 12 and 18 may be made of any suitable material, such as sheet metal, plastic, or the like.

While a specific embodiment of an improved hook guard device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In combination with a fishing pole, an elongated channel-shaped straight jaw member having side flanges gradually diminishing in height toward the end of the jaw member, an angled channel-shaped jaw member having side flanges received within the side flanges of the straight jaw member and also gradually diminishing in height toward the end of the jaw member, opposing transverse coplanar flanges on one end of each of the jaw members, a hollow transverse rivet extending through and pivotally connecting the side flanges of the angled jaw member to the intermediate portions of the side flanges of the straight jaw member at points of maximum height of said flanges, spring means biasing the end portion of the angled jaw member having the transverse flange toward the transverse flange on the end of the straight jaw member, a concave channeled socket element rigidly secured on the back of the straight jaw member and being parallel to said straight jaw member, said socket element receiving said fishing pole, and a flexible string member extending through said hollow rivet and around said pole and releasably securing the socket element to said pole, whereby a fishing hook may be at times received between said jaw members with said transverse flanges grippingly engaging the shank of the hook.

References Cited in the file of this patent

UNITED STATES PATENTS

| | | |
|---|---|---|
| D. 148,526 | Fauteux | Feb. 3, 1948 |
| 226,559 | Shelby | Apr. 13, 1880 |
| 731,335 | Blanchet | June 16, 1903 |
| 936,527 | Fisher | Oct. 12, 1909 |
| 1,269,743 | Richmond | June 18, 1918 |
| 2,028,477 | Rupp | Jan. 21, 1936 |
| 2,127,790 | Smoot | Aug. 23, 1938 |
| 2,202,352 | McGugin | May 28, 1940 |
| 2,279,934 | Wisecup | Apr. 14, 1942 |
| 2,686,334 | Miller | Aug. 17, 1954 |

FOREIGN PATENTS

| | | |
|---|---|---|
| 215,945 | Germany | 1909 |